Feb. 2, 1965     W. A. LEDWITH     3,167,912
THRUST CONTROL FOR SOLID ROCKET
Filed Jan. 4, 1960
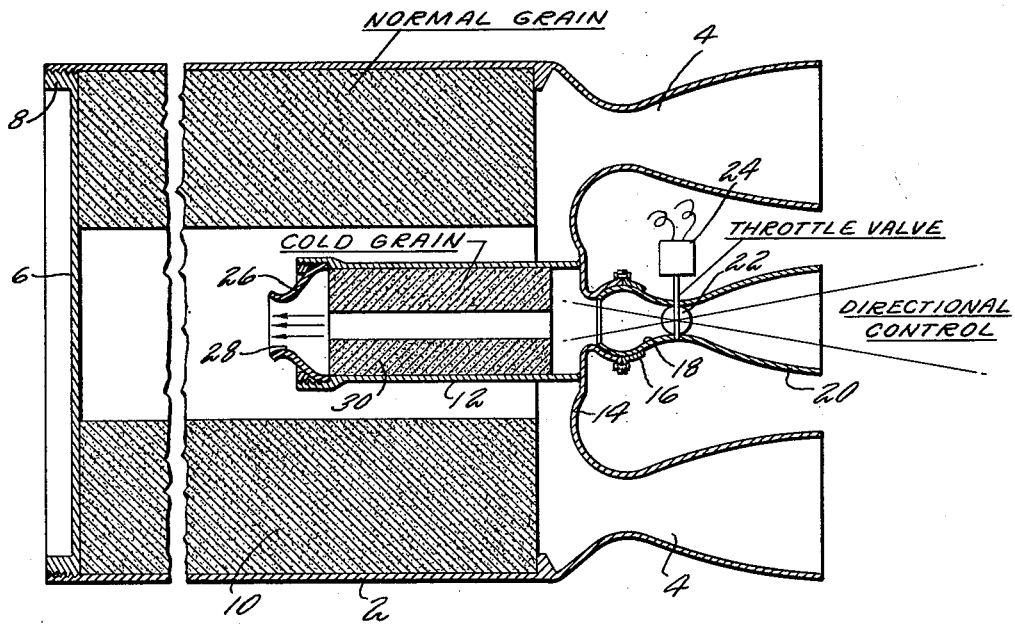
INVENTOR
WALTER A. LEDWITH
BY Charles A. Warren
ATTORNEY

3,167,912
THRUST CONTROL FOR SOLID ROCKET
Walter A. Ledwith, Glastonbury, Conn., assignor to United Aircraft Corporation, East Hartford, Conn., a corporation of Delaware
Filed Jan. 4, 1960, Ser. No. 298
5 Claims. (Cl. 60—35.55)

This invention relates to solid propellant rockets.

One feature of the invention is the control of the rocket thrust by varying the discharge through a control nozzle. Another feature is an auxiliary combustion chamber using "cold-grain" propellant and communicating with the main chamber with an auxiliary thrust nozzle also communicating with the auxiliary combustion chamber with a control for varying the discharge through the auxiliary nozzle. Another feature is the use of the auxiliary control nozzle as a vectorable nozzle for directional control.

The use of an auxiliary combustion chamber is described in the copending Ledwith application Serial No. 813,805, filed May 18, 1959, now Patent No. 3,031,842. The present invention is in certain respects an improvement of the subject matter of the above-identified application, in that the auxiliary combustion chamber discharges through an auxiliary nozzle as well as into the main combustion chamber.

Other features and advantages will be apparent from the specification and claims, and from the accompanying drawing which illustrates an embodiment of the invention.

The single figure is a longitudinal sectional view through the rocket.

The rocket is in the form of a main combustion chamber 2 having a plurality of thrust nozzles 4 at one end thereof. The nozzles 4 are arranged symmetrically about the axis of the chamber as shown. The main combustion chamber 2 has a cap 6 at the end remote from the nozzles 4 which is held as by a ring 8 in chamber closing position. The cap 6 upon being removed, permits insertion within the combustion chamber of a ring 10 of solid propellant.

Centrally positioned within the main chamber 2 is a smaller auxiliary chamber 12 which is attached to and extends from the end cap 14 which supports the nozzles 4 and which carries centrally thereof a part-spherical ring 16. This ring receives a cooperating part-spherical ring 18 on the upstream end of an auxiliary nozzle 20 located within the ring of nozzles 4. The nozzle 20 has a valve 22 positioned in the throat thereof with the position of this valve adjusted by a suitable control mechanism 24.

The auxiliary chamber 12 communicates as shown with the nozzle 20. At the opposite end of the chamber 12 is an end cap 26 having an orifice 28 therein. Thus the chamber 12 discharges products of combustion through the nozzle 20 into the atmosphere and through the orifice 28 into the main chamber. The auxiliary chamber 12 has a block or annulus 30 of solid propellant positioned therein.

The solid propellant 30 in the auxiliary chamber is a "cold-grain" propellant the combustion of which produces gas at a lower temperature than that of the "primary-grain" propellant 10 in the main chamber. This lower temperature of the "cold-grain" gas permits the use of the throttle valve 22.

It is well-known that the rate of combustion in the solid propellant rocket varies with the pressure in the combustion chamber so that as the chamber pressure increases, the rate of burning also increases. Accordingly, the present invention by incorporating a throttle valve 22 provides an arrangement for controlling the rate of combustion within the auxiliary combustion chamber and accordingly, by controlling the pressure and volume of the discharge of gas through the orifice 28 controls, in turn, the pressure within the main combustion chamber. Thus, when the device is in operation, if the throttle valve 22 is moved to restrict the flow through the nozzle 20, the volume and pressure of the products of combustion through the orifice 28 will increase with a resulting increase in pressure in the main combustion chamber. This increase in pressure will, in turn, increase the rate of combustion within the main chamber.

Conversely, if the valve 22 is moved to permit an increase in flow through the nozzle 20 the pressure will drop within the auxiliary chamber 12 with a resulting reduction of pressure and rate of combustion in the main chamber. The structure for controlling the throttle valve 22 may be responsive to the pressure within the main combustion chamber as shown, for example, in the above identified Ledwith application. Alternatively, the throttle valve 22 may be manually controlled.

With the nozzles 4 surrounding the nozzle 20, as shown, and with the nozzle 20 located on the axis of the rocket, it will be apparent that directional control of the rocket may be readily obtained by swivelling the rocket 20 without changing the position of any of the main nozzles 4. Suitable structure for moving the nozzle 20 for directional control is well known and is not in itself a part of the present invention.

It is to be understood that the invention is not limited to the specific embodiment herein illustrated and described, but may be used in other ways without departure from its spirit as defined by the following claims.

I claim:

1. In a rocket, a main combustion chamber having "primary-grain" solid propellant therein, a plurality of nozzles at one end of said chamber arranged symmetrically about the axis of the chamber, an auxiliary rocket chamber within the main chamber and having a slower burning solid propellant therein, said auxiliary chamber having an orifice thereon communicating with the main chamber, an auxiliary thrust nozzle within the symmetrical arrangement of said plurality of nozzles and communicating with said auxiliary chamber and valve means for controlling the flow through said auxiliary nozzle.

2. In a rocket, a main rocket combustion chamber in which a propellant is decomposed, a plurality of nozzles communicating with and located at one end of said chamber, said nozzles being arranged in a ring about the axis of the chamber, an auxiliary chamber located within the main chamber and communicating with the main chamber and having a propellant therein, said auxiliary chamber having an orifice therein connecting said chambers, an auxiliary thrust nozzle also communicating with said auxiliary chamber, and controlling means for adjusting the flow from said auxiliary chamber thereby to control the discharge through the orifice into the main chamber.

3. In a rocket, a main combustion chamber having a solid propellant therein, at least one nozzle at one end of said chamber through which the products of combustion from said chamber are discharged, an auxiliary chamber within said main chamber and having a solid propellant therein, said auxiliary chamber having an orifice providing communication between said chambers, and an auxiliary thrust nozzle located at said one end of said main chamber and communicating with said auxiliary chamber, said auxiliary nozzle having a control valve therein for varying the discharge therethrough.

4. In a rocket, a main combustion chamber having "primary-grain" solid propellant therein, a plurality of nozzles at one end of said chamber arranged symmetrically about the axis of the chamber, an auxiliary rocket chamber within the main chamber and having a slower burning solid propellant therein, said auxiliary chamber having an orifice thereon communicating with the main chamber, an auxiliary thrust nozzle within the symmetrical arrangement of said plurality of nozzles and communicating with said auxiliary chamber and valve means for controlling the flow through said auxiliary nozzle, said auxiliary thrust nozzle being mounted to vector about a point on the axis of the auxiliary nozzle for changing the direction of thrust of said auxiliary nozzle.

5. In a rocket, a main rocket combustion chamber in which a propellant is decomposed, a plurality of nozzles communicating with and located at one end of said chamber, said nozzles being arranged in a ring about the axis of the chamber, an auxiliary chamber located within the main chamber and communicating with the main chamber and having a propellant therein, said auxiliary chamber having an orifice therein connecting said chambers, an auxiliary thrust nozzle also communicating with said auxiliary chamber, and controlling means for adjusting the flow from said auxiliary chamber thereby to control the discharge through the orifice into the main chamber, said auxiliary nozzle being mounted to swing about a point on the axis of the auxiliary nozzle for directional control of the rocket.

References Cited in the file of this patent

UNITED STATES PATENTS

| | | |
|---|---|---|
| 2,555,333 | Grand et al. | June 5, 1951 |
| 2,613,497 | MacDonald | Oct. 14, 1952 |
| 2,661,691 | Brandt | Dec. 8, 1953 |
| 2,816,721 | Taylor | Dec. 17, 1957 |
| 2,968,919 | Hughes et al. | Jan. 24, 1961 |
| 3,050,938 | Twyford | Aug. 28, 1962 |

FOREIGN PATENTS

| | | |
|---|---|---|
| 1,025,827 | France | Jan. 28, 1953 |

OTHER REFERENCES

Astronautics, January 1958, pages 34 and 35.
Space Aeronautics, October 1958, pages 30 and 31.